United States Patent

[11] 3,566,222

[72] Inventor Peter Caleb Frederick Wolfendale
Chiltern Close, Great Brickhill, Bletchley,
Buckinghamshire, England
[21] Appl. No. 866,648
[22] Filed Oct. 15, 1969
[45] Patented Feb. 23, 1971
[32] Priority Oct. 17, 1968
[33] Great Britain
[31] 49181/68

[54] CAPACITIVE DISPLACEMENT TRANSDUCER
9 Claims, 5 Drawing Figs.
[52] U.S. Cl. .................................................. 317/246,
317/249, 323/93, 324/61
[51] Int. Cl. .................................................. H01g 5/04
[50] Field of Search ........................................ 317/246,
249, 249 (T); 324/61 (E); 323/93

[56] References Cited
UNITED STATES PATENTS
3,482,153 12/1969 Caprio .................. 317/249

Primary Examiner—E. A. Goldberg
Attorney—Laurence W. Laubscher

ABSTRACT: A capacitive position transducer comprising two cylindrical coaxial reference electrodes disposed side by side, and a coaxial cylindrical movable electrode disposed within the reference electrodes for movement along the axis to vary the capacitive couplings between the moving electrode and the respective reference electrodes as functions of position. Flanges at each end of the moving electrode are maintained at ground potential and project towards the reference electrodes to form guard rings. One or more screws of conductive or insulating material project through the guard rings to adjust the capacitive couplings. The reference electrodes are spaced from a housing, and the moving electrodes from a shaft, by three-point bearings formed by sapphire balls.

PATENTED FEB23 1971

Peter C. F. Wolfendale
INVENTOR

BY
Lawrence E. Laubscher
ATTORNEY 3,566,222

CAPACITIVE DISPLACEMENT TRANSDUCER

BACKGROUND OF THE INVENTION

This invention relates to a capacitive position transducer comprising a plurality of capacitor electrodes disposed side by side in line, and a further capacitor electrode disposed facing the first electrodes, and guided for movement relative to and along the line of said first electrodes whereby the capacitive couplings between the further electrodes and the first electrodes are functions of the position of the further electrode relative to the first electrodes. Such a transducer can be used to measure position with a high degree of accuracy.

One problem which arises is that of correcting errors in the length of the further electrode.

Another problem which arises is that if the response is very nonlinear over the movement range of the device, accuracy and sensitivity may be reduced.

Another problem which arises is that of satisfactorily supporting the electrodes relative to a housing, and to shaft by which the further electrode may be coupled to mechanical input or output devices, without introducing undesirable electrical perturbations.

SUMMARY OF THE INVENTION

One aspect of the invention provides at least one screw threaded adjustment member mounted for movement with said further electrode and projecting between said further electrode and one of the fist electrodes. Sensitive correction of the effective electrical length of the further electrode can be achieved by rotating the adjustment member.

Another aspect of the invention provides guard electrodes at each end of the further electrode projecting towards said first electrodes. Such guard electrodes restrict the spreading of the electric field at the ends of the further electrode, and increase the linearity within the working range.

Still another aspect of the invention provides a plurality of spacer members of electrically insulating material disposed at the ends of the first electrodes, to space the first electrodes from each other and from the housing. Each spacer member covers a part only of the circumference of the first electrodes, thus reducing electrical perturbations. Preferably the second electrode is secured to a shaft in similar manner.

Other features and advantages of the invention will appear from the following description of the embodiments thereof, given by way of example, with reference to the accompanying drawings.

Figure 1:
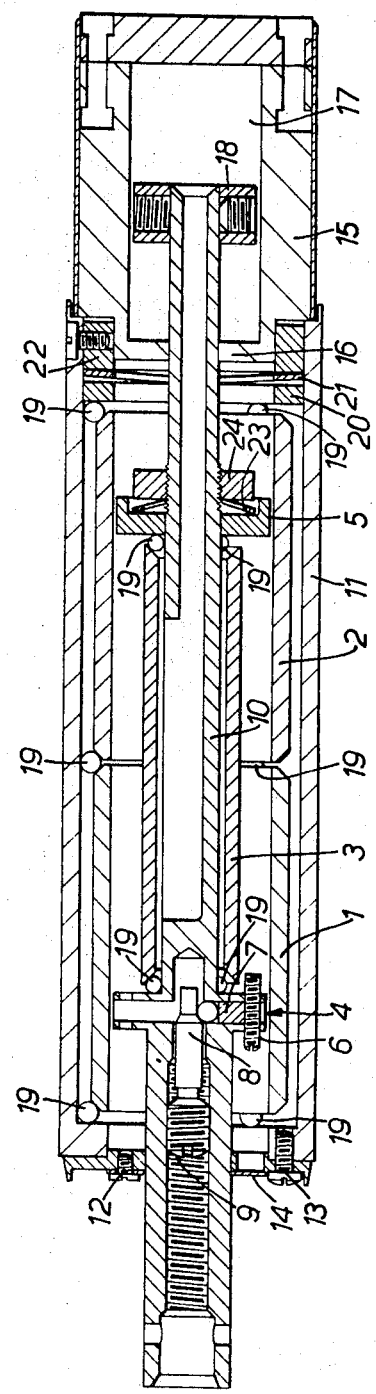
FIG. 1 is a longitudinal sectional view of a capacitive displacement transducer in accordance with the invention.
Figure 3:
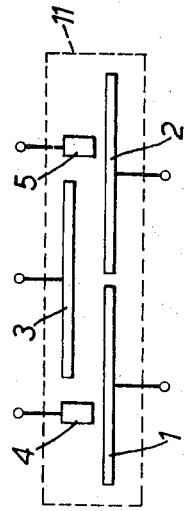
FIG. 3 is a schematic diagram illustrating the electrical arrangement of the transducers of FIGS. 1 and 2.

The transducer shown in FIG. 1 of the drawings comprises two similar cylindrical reference capacitor electrodes 1 and 2 disposed coaxially side by side in line. A third cylindrical capacitor electrode 3 is disposed coaxially within, and facing the electrodes 1 and 2, and is movable relative to the electrodes 1 and 2 along the central axis.

Figure 4:
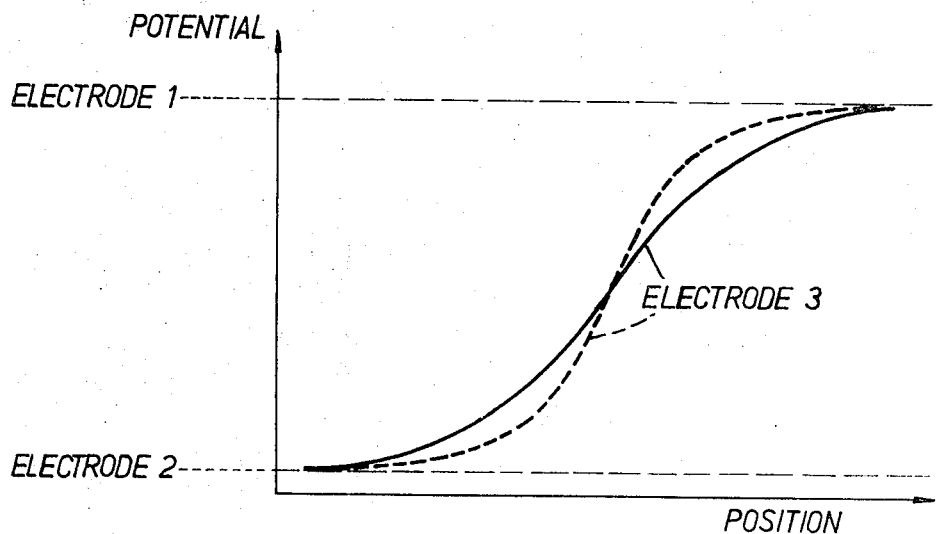
FIG. 4 is a graph showing the potential of a moving electrode in the transducers as a function of its position when a potential difference is applied between two reference electrodes in the transducer.

The capacitive coupling between the electrode 3 and the electrode 1 on the one hand, and between the electrode 3 and the electrode 2 on the other hand is a function of the position of the electrodes 3 relative to the electrodes 1 and 2. Accordingly, if a potential difference is applied between the electrodes 1 and 2, the electrode 3 will assume a potential depending on the position of the electrode 3, and varying between the potentials of the electrodes 1 and 2. The potential of the electrode 3 is illustrated in FIG. 4, and it will be seen that the potential of the electrode 3 approaches that of the electrodes 1 and 2 at each extreme of its range of movement, and varies smoothly between these potentials. If the transducer is to be used to measure position, it is necessary to know the relationship between the potential and the position of the electrode 3, so that associated electrical circuits, for example a bridge circuit or a volt meter, can be calibrated.

The gradient of the potential in the central region of the curve is a function of the axial length of the electrode 3. In particular, the gradient is greater when the length of the electrode 3 is shorter, as shown by the dotted line in FIG. 4.

Figure 5:
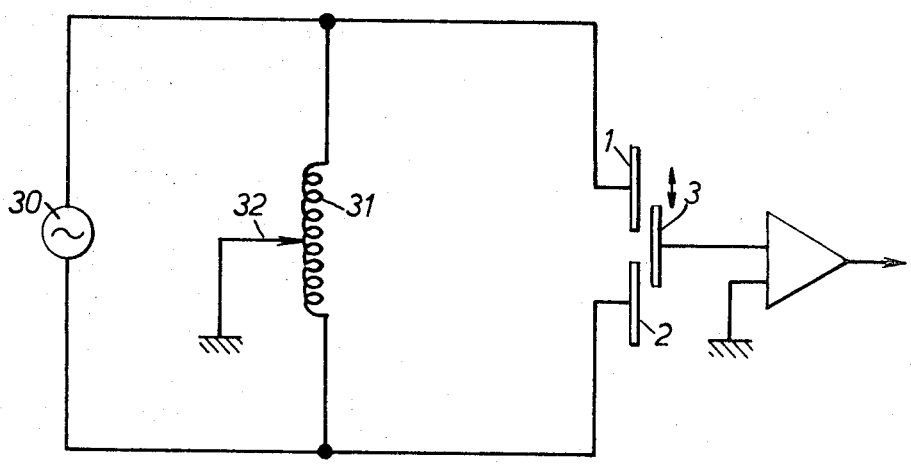
FIG. 5 is a schematic diagram of a preferred electrical circuit incorporating the transducer of FIG. 1 or FIG. 2.

It will be seen that the potential of the electrode 3 varies nonlinearly near the extremes of its range of movement. This effect is due principally to the spreading of the electric field at the ends of the electrode 3. The spreading of the electric field is reduced by means of guard electrodes, and in the preferred design, the guard electrodes project transverse to the electrode 3 towards the electrodes 1 and 2. Such guard electrodes are shown in FIG. 1 and 4 and 5, and comprise flanges disposed at the ends of the electrode 3, and moving with the electrode 3. In one example, the outside diameter of the electrode 3 was 0.25 inches, the gap between facing surfaces of the electrode 3 and the electrode 1 and 2 was 0.10 inches and the gap between facing surfaces of the guard electrodes 4 and 5 and the electrodes 1 and 2 was 0.01 inches.

The guard electrodes 4 and 5 are secured relative to the electrode 3, and do not provide a ready means of adjusting the effective lengths of the electrode 3. Accordingly, a fine adjustment is provided, and this comprises a screw threaded member 6, which projects through the guard electrode 4 into the space between the electrodes 1 and 3. In this embodiment, the adjustment member 6 is of conductive material, and has the effect of shielding part of the electrode 3 from the electrode 1, thus effectively reducing the effective length of the electrode 3. The position of the member 6 relative to the guard ring 4 can be adjusted by simple rotation of the member 6, to alter the effective electrical length of the electrode 3. To lock the position of the member 6, once the adjustment has been made, a plug 7 can be pressed into engagement with the member 6 by means of a cam and roller device 8 connected to a screw 9.

In this embodiment, the electrode 3 is mounted on a shaft 10, and the guard electrode 4 is integral with the shaft 10, the screw 9 being disposed in a bore in the shaft. The electrodes 1, 2 and 3 are all disposed in a housing 11, of electrically conductive material, and one end of the shaft 10 is supported in a bearing 12 adjacent the electrode 1. The bearing 12 is provided with an aperture at 13, by which access may be gained to the member 6, and which may be closed by an electrically conductive cover 14.

At the other end of the housing 11 a cylindrical member 15 defines a chamber in which electrical terminals and connections (not shown) are provided, and which forms a bearing at 16 for the shaft 10. A plate 17 in the chamber 15 is offset from the axis of the transducer and cooperated with a bar 18 secured to the end of the shaft 10 to prevent rotation of the shaft 10.

The housing 11 in cooperation with the member 15 and the bearing 12 forms a complete electrical shield for the transducer, and is normally maintained at earth potential, as is the shaft 10, and guard electrodes 4 and 5. Accordingly, the electrodes 1 and 2 must be insulated from the housing 11, and the electrode 3 must be insulated from the shaft 10. It would also be possible to arrange for the guard electrodes 4 and 5 to be insulated from the shaft 10, if it were desired to maintain the guard electrodes at a potential difference from that of the shaft 10, for example at the potential of the electrode 3.

In this preferred embodiment of the invention, the electrodes 1 and 2 are secured in the housing 11 by means including electrically insulating spacer members disposed at the ends of the electrodes 1 and 2, and which also space apart the electrodes 1 and 2. It has been found desirable to ensure that each of the spacer members extends over a part only of the circumference of the electrodes 1 and 2.

Similarly, the electrode 3 is secured to the shaft 10 by means including a plurality of electrically insulating spacer members and disposed at the ends of the electrode 3, and again it has been found desirable for the spacer members to extend over a part only of the circumference of the electrode 3.

In this embodiment, a set of insulating spacer members is disposed at each end of each electrode 1,2 and 3, and each set of spacer members comprises three spheres of sapphire which engage inclined surfaces on the electrodes 1, 2 and 3, and form a three-point dynamic bearing. Such sapphire spheres are shown at 19 in FIG. 1.

In this embodiment, the assembly of housing 11, electrodes 1 and 2 and the relevant spacer sphere is held together by a washer 20 biased axially of the transducer by a spring washer 21 held by a locking ring 22. Guard ring 5 is disposed slidably on the shaft 10, and the assembly of shaft 10, electrode 3, electrode 5, and the relevant spacer spheres is held together by a spring washer 23, and locking ring 24.

It will be appreciated that the adjustment member 6 need not be of conductive material. If the member 6 is of dielectric material, it effectively increases the length of electrode 3. More than one of the adjustment members 6 may be provided on the guard electrode 4, and similar adjustment might be provided on the guard electrode 5 if desired, although in this particular embodiment access to such adjustment members on the guard electrode 5 would be difficult once the transducer was assembled.

Figure 2:
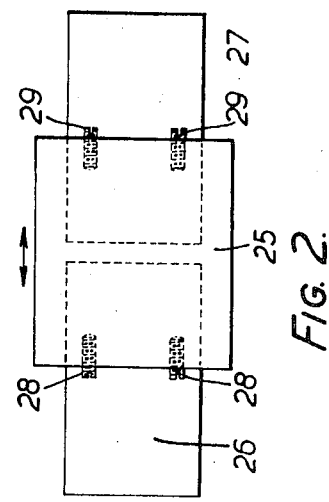
FIG. 2 is a schematic plan view of another capacitive displacement transducer in accordance with the invention.

The transducer shown in FIG. 1 is of cylindrical coaxial configuration, but the invention is applicable to transducers of other configurations for example, the reference electrodes could take the form of segments of a cylinder, being spaced along an arc of the cylinder, with the moving electrode also having the shape of a segment of a cylinder, and moving along a line parallel to the line of reference electrodes. Alternatively, the electrodes could have the form of segment of a circle, the moving electrode moving along a circular arc parallel to the arcuate line of the reference electrodes. By way of example, yet a further configuration is shown in FIG. 2 of the drawings, in which the electrodes are planar, the moving electrode 25 moving along a line parallel to the reference electrodes 26 and 27. In FIG. 2, two screw-threaded adjustment members 28 and 29 are shown mounted in this case on the moving electrode 25, and projecting between the electrodes 25 and 26, and the electrodes 25 and 27, respectively.

The preferred utilization circuit for the transducer is shown in FIG. 5. This is a bridge circuit, in which a source of alternating potential 30 applies a potential difference between the electrodes 1 and 2, and across a potential divider at 31. The potential at a tap 32 on the potential divider 31 is compared with the potential of the electrode 3, and the bridge brought to balance by adjustment of the potential on the tap (if it is desired to measure the position of the electrode 3) or by movement of the electrode 3 (if it is desired to bring the electrode 3 to a desired position) until the difference in potential between the electrode 3 and the tap 32 is zero. To avoid errors due to leakage of flux to earthed parts of the apparatus (such as the housing 11 and shaft 10) the tap 32 is maintained at earth potential, so that at balance the potential of the electrode 3 is also at earth potential.

It is also possible to design a transducer of this kind including more than two reference electrodes, and for example the potentials applied to the reference electrodes may then increase progressively along the line of reference electrodes, so that the potential of the electrode 3 will be a unique function of its position relative to the line of reference electrodes

I claim:

1. A capacitive position transducer comprising first and second capacitor electrodes disposed side by side in line, and a third capacitor electrode disposed facing said first and second electrodes and guided for movement relative to and along the line of said first and second electrodes whereby the capacitive couplings between said third electrode and said first and second electrodes are functions of the position of said third electrode relative to said first and second electrodes, wherein the improvement comprises at least one adjustment member mounted for movement with said third electrode and screw-threaded whereby its position relative to said third electrode can be adjusted, said adjustment member projecting between said first and third electrodes to modify the capacitive coupling between said first and third electrodes.

2. A transducer according to claim 1, and comprising a further adjustment member mounted for movement with said third electrode and screw-threaded whereby its position relative to said third electrode can be adjusted, said further adjustment member projecting between said second and third electrodes to modify the capacitive coupling between said second and third electrodes.

3. A transducer according to claims 1 and comprising guard electrodes secured relative to said third electrode at respective ends of said third electrode, said adjustment member or members being mounted on said guard electrodes.

4. A transducer according to claim 1 wherein the or/each said adjustment member is electrically conductive.

5. A transducer according to claim 1 wherein the or/each said adjustment member is made of dielectric material.

6. A capacitive position transducer comprising a plurality of first capacitor electrodes disposed side-by-side in line, and a second capacitor electrode disposed facing said first electrodes and guided for movement relative to and along the line of said first electrodes whereby the capacitive couplings between said second electrode and respective ones of said first electrodes are functions of the position of said second electrode relative to said first electrodes, wherein the improvement comprises two guard electrodes mounted for movement with said second electrode at respective ends of said second electrode and projecting transverse to said second electrode towards said first electrodes.

7. A transducer according to claim 6 wherein said first and second electrodes are cylindrical and coaxial, and said guard electrodes comprise respective flanges projecting transverse to and coaxial with said second electrode.

8. A capacitive position transducer comprising a housing, a plurality of coaxial cylindrical first capacitor electrodes disposed in said housing side by side in line, and a cylindrical second capacitor electrode disposed within and facing said first electrodes and guided for movement relative to and along the line of said first electrodes whereby the capacitive couplings between said second electrodes and respective ones of said first electrodes are functions of the position of said second electrode relative to said first electrodes, wherein the improvement comprises a plurality of spacer members of electrically insulating material disposed at the ends of said first electrodes to space said first electrodes from each other and from said housing, each said spacer member covering a part only of the circumference of said first electrodes.

9. A transducer according to claim 8 wherein said second electrode is secured to a shaft which is mounted on bearings in said housing and comprising a plurality of further spacer members of electrically insulating material.